United States Patent [19]

Rosenfield

[11] Patent Number: 4,889,044
[45] Date of Patent: Dec. 26, 1989

[54] FRUIT JUICE EXTRACTOR/STRAW

[75] Inventor: Ronald H. Rosenfield, Del Mar, Calif.

[73] Assignee: Alltech Services, Incorporated, San Diego, Calif.

[21] Appl. No.: 317,117

[22] Filed: Feb. 24, 1989

Related U.S. Application Data

[63] Continuation of Ser. No. 21,996, Mar. 5, 1987, abandoned.

[51] Int. Cl.⁴ ............................................. A47G 21/18
[52] U.S. Cl. ......................................... 99/510; D7/42; 99/495; 100/108; 239/33
[58] Field of Search .................. 99/495, 509, 510, 511; 100/107, 108, 109; 239/33, 16, 24; D7/42, 75

[56] References Cited

U.S. PATENT DOCUMENTS 2,746,379  5/1956  Covington ..................... 100/108

FOREIGN PATENT DOCUMENTS 2173686 10/1986 United Kingdom .................. 239/33

OTHER PUBLICATIONS

Popular Science, Jun. 1953, p. 167.

Primary Examiner—Timothy F. Simone

[57] ABSTRACT

A device for extracting juice from oranges and other citrus fruits of various dimensions. The device is capable of capturing most of the juice within the fruit without juice leaking from the device onto the user.

1 Claim, 1 Drawing Sheet

FRUIT JUICE EXTRACTOR/STRAW

This application is a continuation of application Ser. No. 021,996, filed Mar. 5, 1987, abandoned.

BACKGROUND OF THE INVENTION

1. Field of the Invention

This invention relates to a fruit juice extractor/straw whereby juices are extracted from oranges and other citrus fruits with adjustment means permitting its use with different size citrus fruit.

2. Description of the Prior Art

The prior art has disclosed a number of devices which have as their object the extraction of fruit juices. Such devices have utility in providing ease of juice extraction; however, prior art devices have received little commercial acceptance because of leaking, high cost and inadaptability to juice extraction from variable size fruits.

Prior art devices include U.S. Pat. No. 2,746,379. Particular disadvantages of this device are: its inability to adjust to different size fruit; its inability to reach pulp at the bottom of fruit; its inability to operate on fruits having smaller diameter than its fixed shaft length; its inability to reach pulp at the sides of larger fruit, without leaking, through device "angling"; and its large size results in a build-up of internal pressure in the fruit causing fruit rupture or juice leakage. Nor does its large size and heavy weight lend itself to ease of transport. The present invention overcomes all of these disadvantages in that it has an adjustable juice stopper sealing means permitting its use with fruit of varying sizes, a stopper cooperating with tubular means permitting device "angling" thereby reaching most of the pulp at the sides of the larger fruit; and, its design occupies less volume within the fruit, displacing less pulp, thereby reducing internal pressure build-up and eliminating leakage of juice on the user. The invention, of two-piece and light weight construction, can be disassembled and easily transported by the user. These two pieces are known as the stopper and the stem.

SUMMARY OF THE INVENTION

The embodiment of the present invention includes a hollow, tubular stem of external rectangular, cross-section and internal, circular, cross-section which is inserted into the fruit with a "weaving" type motion. This stem, which may be conveniently made of GE Lexan 154 or other suitable plastic material, has a multiplicity of angularly disposed sections which permit its sweeping through the pulp close to the center of the fruit as well as through pulp residing near the rind. The stem has vertically spaced, radial holes which extend a predetermined distance from the bottom of the member, of such size as to permit the free flow of the juices to the user drawing upon the member.

The stopper sealing means cooperates with the stem in such a way as permits the stem to be angularly disposed after the initial sweep of the fruit, thereby capturing a maximum amount of the juices in other areas of the fruit.

One object of the present invention is to provide an improved juice extractor/straw of adjustable length for use with fruit, both large and small.

Another object of the present invention consists in providing stopper sealing means which permit the stem to be angularly disposed to the vertical, permitting a greater volume of juice extraction, without leakage. Said stopper is designed so that when finger force is applied to it, the water residue left from cleaning the fruit becomes trapped. This thinly dispursed liquid generates a surface tension between stopper and fruit that acts as a seal thereby restricting the flow of fruit juice produced from a combination of internal fruit pressure build-up and capillary action.

A further object is to provide a juice extractor/straw having means for withdrawing juice from the fruit including a stem which has a multiplicity of angularly disposed sections, which, when inserted into the fruit in a weaving type motion, displaces a minimum amount of pulp thereby reducing internal fruit pressure and leaking. Thus, inexpensive, convenient and efficient means are provided for withdrawing almost all of the juice from citrus fruits of various dimensions.

DESCRIPTION OF THE PREFERRED EMBODIMENTS

The preferred embodiments are described with reference to a fruit juice extractor/straw. It is to be understood that the preferred embodiments can be adapted to citrus and other type fruit of various dimensions.

Figure 1:
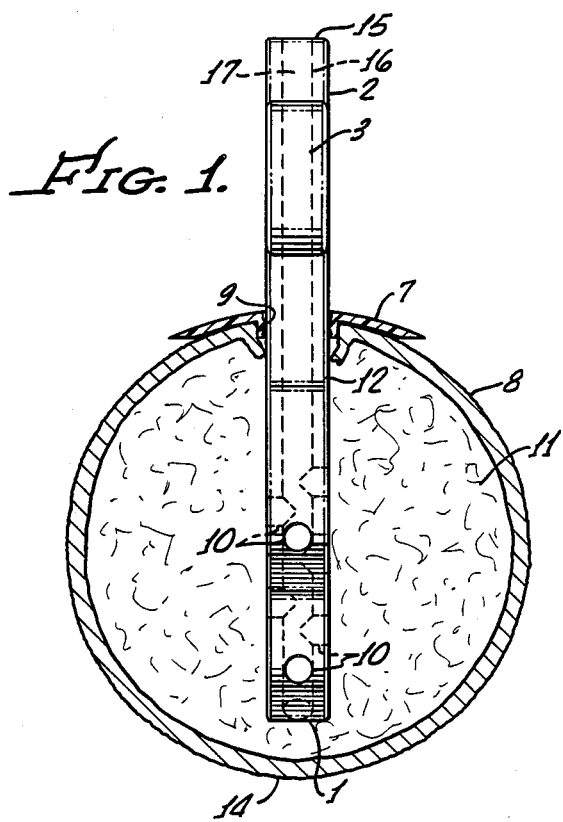
FIG. 1 is an end view of the juice extractor/straw built in accordance with the present invention.
Figure 2:
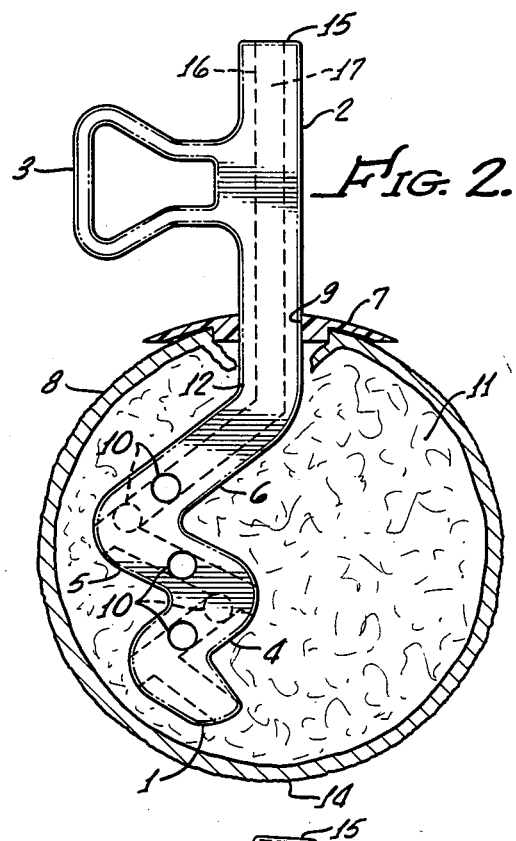
FIG. 2 is a view with the stem rotated 90° situated as it would normally reside inside the fruit.

Referring to FIG. 2, a fruit such as an orange, lemon, grapefruit or the like is indicated at 8. The fruit juice extractor/straw stem 2 is fitted with an annular stopper 7, concave downward, so as to fit the contour of the fruit. The extractor/straw stem 2, and stopper 7, may be made of suitable plastic material, such as GE Lexan 154 or other material approved by the Federal Drug Administration for use with food items. The stem 2 has an elongated body of external rectangular cross-section 9 provided with an axial passageway 17 of circular cross-section, 16, extending from its upper end 15 downwardly to its lower end 1. The juice extractor 2 is preferably of multiple sections configuration, each succeeding section of shorter length and angularly disposed to the previous section, capable of sweeping juice throughout the fruit and into juicer circular holes 10. The stem body 12 (as shown) below the stopper 7 has a first downwardly axial displacement of approximately 53° from the vertical, a second downwardly axial displacement of approximately 60° from the vertical, a third downwardly axial displacement of approximately 55° from the vertical and a fourth downwardly axial displacement of approximately 35° from the vertical. It is to be understood that there may be other embodiments employing different numbers of sections than the four that are disclosed in the preferred embodiment of varying angular displacements from the verticle. The body 12 has vertically spaced radial holes 10 which extend upwardly from the lower end 1 a predetermined distance or to a point in the upper half of the length of the body and of such size as to permit the free flow of the juices into the passages 10 without allowing the entrance of seeds or pulp. The upper end of the stem 2 has a handle 3 formed so as to permit ease of holding the extractor/straw while sucking juice from the fruit.

Figure 3:
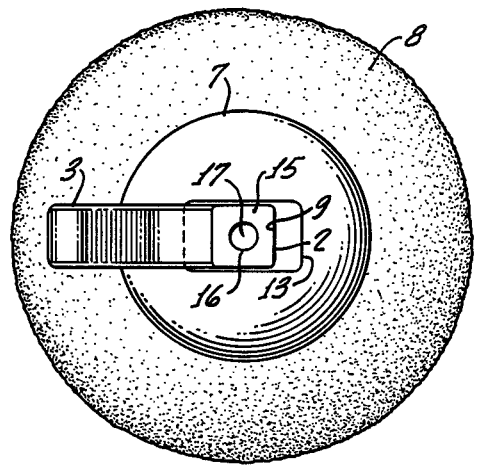
FIG. 3 is a top view of the extractor/straw.
Figure 4:
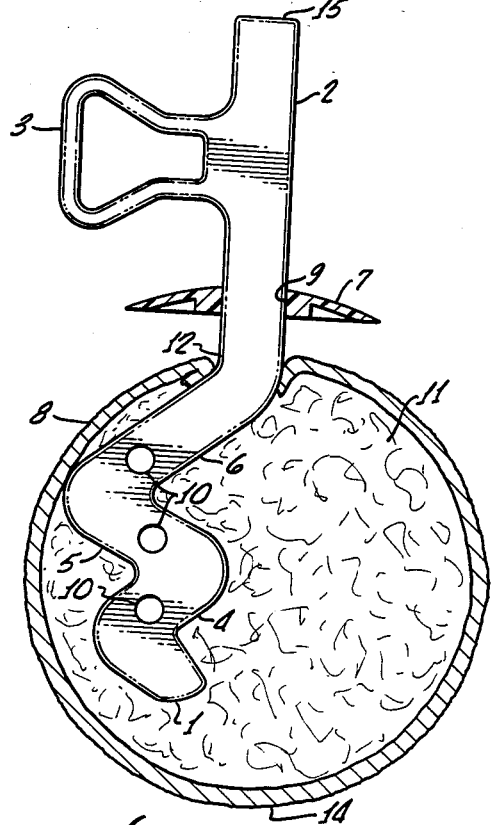
FIG. 4 is a section view with the stem angularly disposed to the vertical.

In operation, after washing the fruit 8, the tip 1 of the extractor is gently inserted into the skin of the fruit. After the first section of the extractor/straw is inserted into the fruit, the entry into the fruit will be stopped by side 4. Gently "weave" and insert extractor/straw until side 4 is perpendicular to a plane tangential to the top of the fruit and thereafter stem will be stopped by side 5. Similarly, continue the "weaving" motion each time the stem is stopped by sides 6 and 12, until the stem has been fully inserted into the fruit, being careful not to enlarge the original hole. Push stopper 7 down lightly onto fruit exterior. Place bottom, 14, of fruit 8 in user's first hand and place second hand on handle 3, maintaining slight pressure on stopper 7 with fingers. Using first hand, carefully turn fruit 8 approximately one turn thereby breaking up pulp of fruit that comes in contact with the stem, 2. Juice now can be withdrawn from extractor/straw by sipping. When sipping no longer yields juice the fruit should be rotated as before while continuing to maintain slight pressure on stopper 7 to prevent leaking. Squeeze fruit and sip continuous flow of juice. To reach other areas, 11, within the fruit, angularly dispose stem 2 and raise it as shown in FIG. 4, being careful to maintain seal by placing finger force on stopper. The stem 2 slideably fits into stopper 7 rectangular hole 13 shown in FIG. 3. Stopper rectangular hole 13 is larger than the stem cross-section 9 to permit angular displacement of extractor with respect to flange. After extractor has thus been angularly disposed, again rotate the fruit and additional juice should then be available for sipping.

I claim:

1. A juice extractor/straw for spherically shaped citrus fruit of various dimensions including a tubular elongated stem of external rectangular cross-section having an open upper end and open lower end and an axial passageway extending from the lower end to the upper end thereof, said upper end of stem being provided with a handle as well as being stopped by a flange having a concave inner surface coacting with the spherical surface of the fruit to provide a tight sealing engagement with the surface of the fruit, said flange also containing an oversized hole which permits said stem to act as a variable length member by passing through said hole, thereby sinking to different depths within the fruit, ultimately reaching to the other end of said fruitn regardless of size, said flange permits said stem to act as an angling member relative to the flange by sweeping through different latitudes of pulp within the fruit when the juice extractor/straw is held rigid and the fruit is rotated, said stem below said flange comprised of a multiplicity of angularly disposed sections which permit said stem to sweep through the pulp close to the center of the fruit as well as through pulp residing near the rind when said variable length and angling capabilities relative to the flange are exercised in combination to one another, each succeeding section being shorter in length than the previous section and being angularly disposed to the previous section having a first downwardly axial displacement of approximately 53 degrees from the vertical, a second downwardly axial displacement of approximately 60 degrees from the vertical, a third downwardly axial displacement of approximately 55 degrees from the vertical and a fourth downwardly axial displacement of approximately 35 degrees from the vertical, such that lower portion of said stem occupies less volume within the fruit, serving to displace less pulp and to reduce internal fruit pressure buildup and leakage, and lower portion of said stem having radial holes communicating with said axial passageway of such size as to permit the free flow of the juices into said stem without allowing the entrance of seeds or pulp in order to withdraw the juice from the fruit when the user sips on the juice extractor/straw and squeezes fruit.

* * * * *